United States Patent
Nour et al.

(10) Patent No.: US 12,517,107 B2
(45) Date of Patent: Jan. 6, 2026

(54) DETECTING HYDROCARBON FUELS IN LUBRICATION OILS

(71) Applicants: Saudi Arabian Oil Company, Dhahran (SA); King Abdullah University of Science and Technology, Thuwal (SA)

(72) Inventors: Maha Nour, Thuwal (SA); Khawlah Kharashi, Thuwal (SA); Khaled Nabil Salama, Thuwal (SA); Abdullah Hassan Bukhamsin, Thuwal (SA); Esraa Fakeih, Thuwal (SA); Sumana Bhattacharjee, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 343 days.

(21) Appl. No.: 18/298,776

(22) Filed: Apr. 11, 2023

(65) Prior Publication Data
US 2024/0345062 A1   Oct. 17, 2024

(51) Int. Cl.
   *G01N 33/28*   (2006.01)
   *G01N 27/00*   (2006.01)
(52) U.S. Cl.
   CPC ....... *G01N 33/2888* (2013.01); *G01N 27/002* (2013.01)
(58) Field of Classification Search
   CPC .................. G01N 33/2888; G01N 27/002
   See application file for complete search history.

(56) References Cited

U.S. PATENT DOCUMENTS

| | | | |
|---|---|---|---|
| 3,156,644 A | 11/1964 | Kunin | |
| 4,031,398 A | 6/1977 | Callis et al. | |
| 4,307,061 A | 12/1981 | Sarholz | |
| 4,651,010 A | 3/1987 | Javan | |
| 5,269,175 A * | 12/1993 | Chmiel | G01N 27/225 324/675 |
| 5,422,719 A | 6/1995 | Goldstein | |

(Continued)

FOREIGN PATENT DOCUMENTS

| | | | |
|---|---|---|---|
| CZ | 309455 B6 * | 1/2023 | ............ G01M 3/045 |
| FR | 2817346 | 5/2002 | |

(Continued)

OTHER PUBLICATIONS

CZ-309455-B6 (Year: 2023).*

(Continued)

*Primary Examiner* — Fatemeh Esfandiari Nia
(74) *Attorney, Agent, or Firm* — Fish & Richardson P.C.

(57) ABSTRACT

A fuel detection film includes a cyclic olefin copolymer that is insoluble in acyclic saturated hydrocarbons. The fuel detection film has a porous structure that defines a plurality of pores. The plurality of pores are configured to allow flow of a lubrication oil through the fuel detection film via the plurality of pores. A housing is configured to couple to a pipe flowing the lubrication oil. The housing defines a slot. The slot is configured to hold the fuel detection film. The fuel detection film, while held by the slot of the housing that is coupled to the pipe as the lubrication oil flows in the pipe, is configured to at least partially dissolve in a presence of an aromatic hydrocarbon in the lubrication oil flowing through the fuel detection film.

18 Claims, 5 Drawing Sheets

(56) References Cited

U.S. PATENT DOCUMENTS

| | | | |
|---|---|---|---|
| 5,818,582 | A | 10/1998 | Fernandez et al. |
| 5,899,567 | A | 5/1999 | Morris, Jr. |
| 5,982,847 | A | 11/1999 | Nelson |
| 6,023,961 | A | 2/2000 | Discenzo |
| 6,507,401 | B1 | 1/2003 | Turner |
| 6,525,325 | B1 | 2/2003 | Andrews et al. |
| 6,692,720 | B1 | 2/2004 | Ninane et al. |
| 6,707,556 | B2 | 3/2004 | Turner |
| 6,911,830 | B2 | 6/2005 | Heremans et al. |
| 7,442,291 | B1 | 10/2008 | Discenzo |
| 7,839,492 | B2 | 11/2010 | Parks, II et al. |
| 8,017,408 | B2 | 9/2011 | Meinhart et al. |
| 8,390,796 | B2 | 3/2013 | Honda |
| 8,408,073 | B2 | 4/2013 | Sparks et al. |
| 8,704,174 | B2 | 4/2014 | Ukon |
| 8,910,514 | B2 | 12/2014 | Sullivan et al. |
| 9,206,386 | B2 | 12/2015 | Tunheim et al. |
| 9,255,875 | B2 | 2/2016 | Denenberg et al. |
| 9,518,918 | B2 | 12/2016 | Mann et al. |
| 9,822,356 | B2 | 11/2017 | Ismagilov et al. |
| 10,060,899 | B2 | 8/2018 | Hegazi et al. |
| 10,100,966 | B2 | 10/2018 | Vermont et al. |
| 10,317,388 | B2 | 6/2019 | Hegazi et al. |
| 10,502,409 | B2 | 12/2019 | Meinhart et al. |
| 10,643,324 | B2 | 5/2020 | Al Shehri et al. |
| 10,768,094 | B2 | 9/2020 | Amer et al. |
| 10,908,069 | B2 | 2/2021 | Amer et al. |
| 2002/0158211 | A1 | 10/2002 | Gillispie |
| 2003/0133105 | A1 | 7/2003 | Gorelik et al. |
| 2003/0141459 | A1 | 7/2003 | Hegazi et al. |
| 2004/0007675 | A1 | 1/2004 | Gillispie et al. |
| 2004/0124366 | A1 | 7/2004 | Zeng et al. |
| 2006/0042966 | A1* | 3/2006 | Hariu ............... G01N 33/2888 205/787.5 |
| 2006/0114007 | A1 | 6/2006 | Cho |
| 2007/0009423 | A1 | 1/2007 | Handy et al. |
| 2007/0063140 | A1 | 3/2007 | Liu |
| 2007/0095395 | A1 | 5/2007 | Spiess |
| 2007/0187617 | A1 | 8/2007 | Kong |
| 2009/0006004 | A1 | 1/2009 | Sens et al. |
| 2009/0216419 | A1 | 8/2009 | Shaw |
| 2010/0269579 | A1 | 10/2010 | Lawrence et al. |
| 2011/0155925 | A1 | 6/2011 | Ukon |
| 2011/0166802 | A1 | 7/2011 | Kong |
| 2011/0236569 | A1 | 9/2011 | Weiller |
| 2011/0267603 | A1 | 11/2011 | Shaw |
| 2011/0303834 | A1 | 12/2011 | Hegazi et al. |
| 2012/0086942 | A1 | 4/2012 | Honda |
| 2013/0333893 | A1 | 12/2013 | Morris |
| 2014/0198313 | A1 | 7/2014 | Tracy et al. |
| 2015/0009495 | A1 | 1/2015 | Li et al. |
| 2015/0085290 | A1 | 3/2015 | Fjerdingstad |
| 2015/0168368 | A1 | 6/2015 | Hegazi et al. |
| 2016/0195509 | A1 | 7/2016 | Jamieson |
| 2016/0202194 | A1 | 7/2016 | Lees |
| 2016/0349198 | A1 | 12/2016 | Barney |
| 2017/0219556 | A1* | 8/2017 | Ciampini ............ G01N 27/126 |
| 2021/0255039 | A1 | 8/2021 | Morgan, III |
| 2021/0389264 | A1 | 12/2021 | Ito et al. |
| 2023/0280232 | A1* | 9/2023 | Cao .................... G01M 3/186 73/40 |
| 2023/0314402 | A1 | 10/2023 | Nour et al. |

FOREIGN PATENT DOCUMENTS

| | | | |
|---|---|---|---|
| WO | WO-2008074559 A1 * | 6/2008 | ............. G01N 27/22 |
| WO | WO 2020047469 | 3/2020 | |

OTHER PUBLICATIONS

Aboaba et al., "Brain Tumor Quantification Equation: Modeled on Complete Step Response Algorithm," International Conference on Computer and Communication Engineering (ICCCE 2012), Jul. 3-5, 2012, 988-991, 4 pages.

Agha et al., "A Review of Cyclic Olefin Copolymer Applications in Microfluidics and Microdevices," Macromolecular Materials and Engineering, 2022, 307(2200053):1-34, 35 pages.

Al-Abdullah et al., "Flash points and volatility characteristics of gasoline/diesel blends," Fuel, Aug. 2015, 153:67-69, 3 pages.

Al-Samhan et al., "Evaluating scale deposition and scale tendency of effluent water mix with seawater for compatible injection water," Journal of Petroleum Exploration and Production Technology, Mar. 10, 2020, 10(5):2105-2111, 7 pages.

Alvarez et al., "Prediction of Flash-Point Temperature of Alcohol/Biodiesel/Diesel Fuel Blends," Ind. Eng. Chem. Res., Apr. 2019, 58(16):6860-6869, 10 pages.

Beck et al., "Development and characterization of a mobile photoacoustic sensor for on-line soot emission monitoring in diesel exhaust gas," Analytical and Bioanalytical Chemistry, Mar. 28, 2003, 375(8):1136-1143, 8 pages.

Bedoui et al., "Design and Electro-Thermal Analysis of a Platinum Micro Heater for Gas Sensors," 2016 13th International Multi-Conference on Systems, Signals & Devices (SSD), Mar. 2016, 4:558-561, 4 pages.

Bernasconi et al., "Advanced Pipeline Vibroacoustic Monitoring," Proceedings of the ASME 2013 Pressure Vessels and Piping Conference, PVP2013, Paris, France, Jul. 14-18, 2013, 7 pages.

Bhavani et al., "Diesel to Dual Fuel Conversion Process Development," International Journal of Engineering & Technology, Jul. 2018, 7(3):306-310, 5 pages.

Bieler et al., "Calibration of the step response of a 70 GHz sampling oscilloscope using a novel optoelectronic technique," 2008 Conference on Precision Electromagnetic Measurements Digest, Jun. 8-13, 2008, 678-679, 2 pages.

Bridges et al., "G-9-Small-Signal Step Response of Laser Amplifiers and Measurement of CO2 Laser Linewidth," IEEE Journal of Quantum Electronics, Nov. 1968, QE-4(11):777-782, 6 pages.

Brueckner et al., "Tunable diode laser absorption spectroscopy as method of choice for non-invasive and automated detection of microbial growth in media fills," Talanta, May 2017, 167:21-29, 9 pages.

Butler et al., "Prediction of Flash Points of Middle Distillates," Ind. Eng. Chem., Apr. 1956, 48(4):808-812, 5 pages.

Calaon et al., "Injection and injection-compression moulding replication capability for the production of polymer lab-on-a-chip with nano structures," Journal of Micromechanics and Microengineering, Sep. 12, 2017, 27(10), 13 pages.

Chan et al., "Size-Controlled Growth of CdSe Nanocrystals in Microfluidic Reactors," Nano Letters, Feb. 2003, 3(2):199-201, 3 pages.

Chen et al., "3D-printed microfluidic devices: fabrication, advantages and limitations—a mini review," Analytical Methods, Aug. 2016, 8(31):6005-6012, Aug. 21, 2016, 8 pages.

COC Topas Product Brochure, Section 4.2; Table 2, Mar. 2006, 20 pages.

Demirbas et al., "Diesel Fuel From Waste Lubricating Oil by Pyrolitic Distillation," Pet. Sci. Technol., 33(2): 129-138, Dec. 2015, 12 pages.

Fiorentin et al., "Effect of the finite memory length of a recorder in evaluating its frequency response of from step response," Instrumentation and Measurement Technology Conference, Anchorage, AK, USA, May 21-23, 2002, 1:787-791, 5 pages.

Foerster et al., "In situ monitoring of microfluidic distillation" Chemical Engineering Journal, 2013, 227:13-21, 9 pages.

Ghosh et al., "A mass manufacturable thermoplastic based microfluidic droplet generator on cyclic olefin copolymer," J. Micromechanics Microengineering, Apr. 10, 2019, 29(055009):1-9, 9 pages.

Giordano et al., "Distilling small volumes of crude oil," Fuel, Feb. 2021, 285(119072):1-8, 8 pages.

Gülüm et al., "Density, flash point and heating value variations of corn oil biodiesel-diesel fuel blends," Fuel Processing Technology, Jun. 2015, 134:456-464, 9 pages.

Hafeez et al., "Liquid fuel synthesis in microreactors," React. Chem. Eng., Aug. 2018, 3(4):414-432, 19 pages.

(56) References Cited

OTHER PUBLICATIONS

Hartman et al., "Distillation in microchemical systems using capillary forces and segmented flow," Lab on a Chip, First published as an Advance Article on the web Apr. 7, 2009, 9(13):1843-1849, 7 pages.
Hartman et al., "Multistep Microchemical Synthesis Enabled by Microfluidic Distillation," Angew. Chem. Int. Ed., Jan. 2010, 49(5): 899-903, 5 pages.
Hibara et al., "Microfluidic Distillation Utilizing Micro-Nano Combined Structure," Chem. Lett., Sep. 2008, 37(10):1064-1065, 2 pages.
Hossain et al., "Designing of Hollow Core Grapefruit Fiber Using Cyclo Olefin Polymer for the Detection of Fuel Adulteration in Terahertz Region," Polymers, Dec. 29, 2022, 15(151):1-15, 15 pages.
Hua et al., "Determination of sulfur-containing compounds in diesel oils by comprehensive two-dimensional gas chromatography with a sulfur chemiluminescence detector," Journal of Chromatography A, Nov. 2003, 1019(1-2):101-109, 9 pages.
Jain et al., "Design and Simulation of Microfluidic Passive Mixer With Geometric Variation," Int. J. Res. Eng. Technol., Feb. 2016, 5(2):55-58, 4 pages.
Jena et al., "Cyclic olefin copolymer based microfluidic devices for biochip applications: Ultraviolet surface grafting using 2-methacryloyloxyethyl phosphorylcholine," Biomicrofluidics, Mar. 2012, 6(1):012822-1-012822-12, 12 pages.
Jena et al., "Micro fabrication of cyclic olefin copolymer (COC) based microfluidic devices," Microsystem Technologies, Oct. 18, 2011, 18(2):159-166, 8 pages.
Jiménez et al., "Chemiluminescence detection systems for the analysis of explosives," J. Hazard. Mater., Jan. 2004, 106(1): 1-8, 8 pages.
Jinno et al., "Identification of Polycyclic Aromatic Hydrocarbons in Extracts of Diesel Particulate Matter by Supercritical Fluid Chromatography Coupled with an Ultraviolet Multichannel Detector," Analytical Chemistry, 1986, 58(13): 2696-2699, 4 pages.
Kan et al., "Scale Prediction for Oil and Gas Production," SPE Journal, Jun. 2012, 17(2):362-378, 17 pages.
Karnati et al., "Design of Micro-heaters Inspired by Space Filling Fractal Curves," 2019 IEEE Region 10 Symposium (TENSYMP), Jun. 7-9, 2019, 231-236, 6 pages.
Kimmich et al., "Fault detection for modern Diesel engines using signal- and process model-based methods," Control Eng. Pract., Feb. 2005, 13(2):189-203, 15 pages.
Kothare et al., "Microreactors for efficient on-chip fuel processing and hydrogen generation," Nanofabrication: Technologies, Devices, and Applications, Jan. 2005, 5592(19):241-253, 13 pages.
Kraus et al., "An integrated multiphase flow sensor for microchannels," Experiments in Fluids, Jun. 2004, 36(6):819-832, 14 pages.
Lam et al., "Development of multistage distillation in a microfluidic chip," Lab on a Chip, Apr. 2011, 11(7):1311-1317, 7 pages.
Lam et al., "Towards an understanding of the effects of operating conditions on separation by microfluidic distillation," Chem. Eng. Sci., 66(10):2098-2106, May 2011, 9 pages.
Lamonte et al., "Cyclic Olefin Copolymers," Advanced Materials & Processes, Mar. 2001, 159(3):33-36, 4 pages.
Li et al., "Isoelectric focusing in cyclic olefin copolymer microfluidic channels coated by polyacrylamide using a UV photografting method," Electrophoresis, May 2005, 26(9):1800-1806, 7 pages.
Lin et al., "Integrated microfluidic reactors," Nano Today, Dec. 2009, 4(6):470-481, 12 pages.
Liu et al., "Micro-distillation system for formaldehyde concentration detection," Chem. Eng. J., Nov. 2016, 304:419-425, 7 pages.
Ljubas et al., "Influence of engine oils dilution by fuels on their viscosity, flash point and fire point," NAFTA, 2010, 61(2):73-79, 7 pages.
McGann et al., "Lean fuel detection with nanosecond-gated laser-induced breakdown spectroscopy," Combustion and Flame, Feb. 2021, 224:209-218, 10 pages.

McGuire et al., "Detection of the aromatic molecule benzonitrile (c-C6H5CN) in the interstellar medium," Science, Jan. 12, 2018, 359(6372):202-205, 4 pages.
Mehra et al., "A Six-Wafer Combustion System for a Silicon Micro Gas Turbine Engine," J. Microelectromechanical Syst., Dec. 2000, 9(4):517-527, 11 pages.
Mendonca et al., "Application of step response impedance spectroscopy for detection of skin irritation," Proceedings of the 25th Annual International Conference of the IEEE, Cancun, Mexico, Sep. 17-21, 2003, 4:3215-3217, 3 pages.
Mitsuichemicals.com [online], "APEL," available on or before 2021, retrieved on Feb. 14, 2022, retrieved from URL <https://jp.mitsuichemicals.com/en/special/apel/about/properties/>, 7 pages.
Mulrooney et al., "Detection of carbon dioxide emissions from a diesel engine using a mid-infrared optical fibre based sensor," Sensors and Actuators A, May 2007, 136(1):104-110, 7 pages.
Nunes et al., "Cyclic olefin polymers: emerging materials for lab-on-a-chip Applications," Microfluid Nanofluid, Apr. 2010, 9:145-161, 17 pages.
Olajire, "A review of oilfield scale management technology for oil and gas production," Journal of Petroleum Science and Engineering, Nov. 2015, 135:723-737, 15 pages.
Petermann, "Chapter 4: Intensity-Modulation Characteristics of Laser Diodes," Laser diode modulation and Noise, Kluwer Academic, 1991, 78-118, 41 pages.
Rowland et al., "The Automated Assessment of Ultrasound Scanner Lateral and Slice Thickness Resolution: Use of the Step Response," Ultrasound in Medicine & Biology, Sep. 2009, 35(9):1525-1534, 10 pages.
Schuresko et al., "Carboxylation kinetics of hemoglobin and myoglobin: Linear Transient Response to Step Perturbation by Laser Photolysis," Biophysical Journal, Oct. 1978, 24(1): 382-383, 2 pages.
Seo et al., "Continuous Microfluidic Reactors for Polymer Particles," Langmuir, Dec. 2005, 21(25):11614-11622, 9 pages.
Shi-pe.shi.co.jp [online], "Course 4—Consider a mixing vessel as a huge viscometer," Available on or before Jun. 26, 2018, Internet Archive: Wayback Machine URL <https://web.archive.org/web/20240000000000/https://www.shi-pe.shi.co.jp/english/technology/mixing-lecture/004/index.html>, retrieved on Aug. 20, 2020, <https://www.shi-pe.shi.co.jp/english/technology/mixing-lecture/004/index.html>, 3 pages.
Soud, "Downstream oil theft: countermeasures and good practices," Atlantic Council, May 2020, retrieved from URL <https://www.atlanticcouncil.org/wp-content/uploads/2020/05/AC_OilTheft-Final-1.pdf>, 56 pages.
Spannhake et al., "High-temperature MEMS heater platforms: Long-term Performance of Metal and Semiconductor Heater Materials," Sensors, Apr. 7, 2006, 6(4):405-419, 15 pages.
Taghizadeh-Alisaraei et al., "Fault detection of injectors in diesel engines using vibration time-frequency analysis," Applied Acoustics, Jan. 1, 2019, 143:48-58, 11 pages.
Thomassci.com [online], "Multi-Position Hot Plate Stirrer," 2022, retrieved on Feb. 15, 2022, retrieved from URL <https://www.thomassci.com/Equipment/Hot-Plates/_/Multi-Position-Hot-Plate-Stirrer?q=Multi%20Position%20Hotplate%20Stirrer>, 2 pages.
Udonne, "A comparative study of recycling of used lubrication Oils using distillation, acid and activated charcoal with clay methods," Journal of Petroleum and Gas Engineering, Feb. 2011, 2(2):12-19, 8 pages.
U.S. Appl. No. 18/128,903, Nour et al., Thin Polymer Film Dissolved Under Tension to Detect Hydrocarbon Fuels Hidden in Paraffin-Based Lubrication Oils, filed Mar. 30, 2023, 29 pages.
U.S. Appl. No. 18/128,909, Nour et al., Changes in Resistivity of Mesh-Patterned Polymer Thin Films Coated with Conductive Traces Used to Detect Hydrocarbon Fuels Hidden in Paraffin-based Lubrication Oils, filed Mar. 30, 2023, 30 pages.
U.S. Appl. No. 18/135,533, Nour et al., Magnetic Film Fuel Detector, filed Apr. 17, 2023, 18 pages.
U.S. Appl. No. 18/135,535, Kharashi et al., Hydrocarbon Contaminant Detection Using Polymer Film, filed Apr. 17, 2023, 24 pages.
U.S. Appl. No. 18/135,539, Nour et al., Polymer Film Resistance Fuel Detector, filed Apr. 17, 2023, 19 pages.

(56) References Cited

OTHER PUBLICATIONS

U.S. Appl. No. 18/301,581, Kharashi et al., Hydrocarbon Contaminant Detection Using Polymer Film, filed Apr. 17, 2023, 25 pages.
U.S. Appl. No. 18/301,610, Nour et al., Polymer Film Fuel Detector, filed Apr. 17, 2023, 19 pages.
Vahdati et al., "External Corrosion Detection of Oil Pipelines Using Fiber Optics," Sensors, Jan. 26, 2020, 20(684):1-16, 16 pages.
Van-Den-Begin et al., "Fast adsorption-desorption kinetics of hydrocarbons in silicalite-1 by the single-step frequency response method," Zeolites, Jul. 1989, 9(4): 287-292, 6 pages.
Wardzinska et al., "Step response sensitivity of VLSI Interconnects," 17th IEEE Workshop on Signal and Power Integrity (SPI), May 12-15, 2013, 4 pages.
Wronski et al., "The step response: a method to characterize mechanisms of renal blood flow autoregulation," American Journal of Physiology—Renal Physiology, First published Jul. 8, 2003, 285(4):F758-F764, 7 pages.
Yamagata et al., "Synthesis of highly fluorescent diketopyrrolopyrrole derivative and two-step response of fluorescence to acid," Tetrahedron Letters, Mar. 24, 2010, 51(12): 1596-1599, 4 pages.
Yang et al., "Determination of sulfur compounds in catalytic diesel oil by gas chromatography with atomic emission detector and its applications," Chinese Journal of Chromatography, Nov. 1, 2002, 20(6):493-497, Abstract Only, 2 pages.
Youn et al., "Fabrication of micro mold for hot-embossing of polyimide microfluidic platform by using electron beam lithography combined with inductively coupled plasma," Microelectron. Eng., 2008, 85(5-6):918-921, 4 pages.
Yu et al., "A novel polyimide based micro heater with high temperature uniformity," Sensors Actuators A: Physical, Feb. 2017, 257:58-64, 7 pages.
Zhang et al., "Spray model based on step response theory," Fuel, May 2012, 95(1): 499-503, 5 pages.
Zhang et al., "Design of the microfluidic chip of oil detection," Applied Mechanics and Materials, 117-119:517-520, Available online since Oct. 24, 2011, 5 pages.
Zhao et al., "Design principles and fabrication method for a miniaturized fuel gas combustion reactor," Sensors, The 3rd Conference on MicroFluidic Handling Systems, Oct. 4-6, 2017, 4 pages.

* cited by examiner

DETECTING HYDROCARBON FUELS IN LUBRICATION OILS

TECHNICAL FIELD

This disclosure relates to detection of hydrocarbon fuels in lubrication oils.

BACKGROUND

Fuel smuggling is unfortunately a lucrative illegal act that is committed in various parts of the world. In some cases, fuels are transported to neighboring countries through illegal means. In some cases, fuels are diluted to increase volume in generating an increased profit. Sometimes petroleum products are diluted at the midstream level and transported downstream for sale to avoid detection of such dilution. In other cases, fuels are mixed with and hidden in other products to avoid detection of smuggling.

SUMMARY

This disclosure describes technologies relating to devices that can be used to detect hydrocarbon fuels in lubrication oils. Certain aspects of the subject matter described can be implemented as an assembly. The assembly includes a fuel detection film and a housing. The fuel detection film includes a cyclic olefin copolymer that is insoluble in acyclic saturated hydrocarbons. The fuel detection film has a porous structure that defines a plurality of pores. The plurality of pores are configured to allow flow of a lubrication oil through the fuel detection film via the plurality of pores. The housing is configured to couple to a pipe flowing the lubrication oil. The housing defines a slot. The slot is configured to hold the fuel detection film. The fuel detection film, while held by the slot of the housing that is coupled to the pipe as the lubrication oil flows in the pipe, is configured to at least partially dissolve in a presence of an aromatic hydrocarbon in the lubrication oil flowing through the fuel detection film.

This, and other aspects, can include one or more of the following features. The assembly can include a multimeter. The multimeter can be coupled to the fuel detection film at two locations on the fuel detection film. The multimeter can be configured to apply a current across the fuel detection film. The multimeter can be configured to measure a resistance of the fuel detection film at least based on a voltage drop exhibited by the current applied across the fuel detection film in response to the current applied across the fuel detection film. A decrease in the resistance of the fuel detection film can indicate at least partial dissolution of the fuel detection film and the presence of the aromatic hydrocarbon in the lubrication oil. The housing can include a first portion and a second portion coupled together. The slot can be defined between the first portion and the second portion. The first portion and the second portion can be made of silicon, glass, quartz, polymethyl methacrylate, or any combinations of these. The fuel detection film can have a thickness in a range of from about 5 micrometers (μm) to about 500 μm.

Certain aspects of the subject matter described can be implemented as a system. The system includes a pipe, a housing, a fuel detection film, and a multimeter. The pipe defines a first inner bore that is configured to flow a lubrication oil. The housing is coupled to the pipe. The housing defines a second inner bore and a cross-sectional slot. The second inner bore of the housing is aligned with the first inner bore of the pipe for flow of the lubrication oil. The fuel detection film is disposed within the cross-sectional slot of the housing. The fuel detection film spans across the second inner bore of the housing. The fuel detection film includes a cyclic olefin copolymer that is insoluble in acyclic saturated hydrocarbons. The fuel detection film has a porous structure that defines a plurality of pores. The plurality of pores are configured to allow flow of the lubrication oil through the fuel detection film via the plurality of pores. The fuel detection film is configured to at least partially dissolve in a presence of an aromatic hydrocarbon in the lubrication oil flowing through the fuel detection film. The multimeter is coupled to the fuel detection film at two locations on the fuel detection film. The multimeter is configured to apply a current across the fuel detection film. The multimeter is configured to measure a resistance of the fuel detection film at least based on a voltage drop exhibited by the current applied across the fuel detection film. A change in the resistance of the fuel detection film indicates at least partial dissolution of the fuel detection film and the presence of the aromatic hydrocarbon in the lubrication oil.

This, and other aspects, can include one or more of the following features. The housing can include a first portion and a second portion coupled together. The cross-sectional slot can be defined between the first portion and the second portion. The first portion and the second portion can be made of silicon, glass, quartz, polymethyl methacrylate, or any combinations of these. The fuel detection film can have a thickness in a range of from about 5 μm to about 500 μm.

Certain aspects of the subject matter described can be implemented as a method. A lubrication oil is flowed through a fuel detection film. The fuel detection film is coupled to a pipe. The fuel detection film includes a cyclic olefin copolymer that is insoluble in acyclic saturated hydrocarbons. The fuel detection film has a porous structure defining a plurality of pores. The plurality of pores are configured to allow flow of the lubrication oil through the fuel detection film via the plurality of pores. The fuel detection film is configured to at least partially dissolve in a presence of an aromatic hydrocarbon in the lubrication oil flowing through the fuel detection film. It is detected whether the fuel detection film has at least partially dissolved in response to the lubrication oil flowing through the fuel detection film. At least partial dissolution of the fuel detection film in response to the lubrication oil flowing through the fuel detection film indicates the presence of an aromatic hydrocarbon in the lubrication oil.

This, and other aspects, can include one or more of the following features. A current can be applied across the fuel detection film as the lubrication oil flows through the fuel detection film. A resistance of the fuel detection film can be measured at least based on a voltage drop exhibited by the current applied across the fuel detection film in response to the current applied across the fuel detection film. A multimeter can be coupled to the fuel detection film at two locations on the fuel detection film. The multimeter can apply the current across the fuel detection film and measures the resistance of the fuel detection film. Detecting whether the fuel detection film has at least partially dissolved can include detecting a change in the resistance of the fuel detection film. A decrease in the resistance of the fuel detection film can indicate at least partial dissolution of the fuel detection film and the presence of the aromatic hydrocarbon in the lubrication oil. The fuel detection film can be disposed within a cross-sectional slot of a housing that is coupled to the pipe. The housing can define a first inner bore that is aligned with a second inner bore of the pipe through which the lubrication oil flows. The fuel detection film can span across the first inner bore of the housing. The housing can include a first portion and a second portion coupled together. The cross-sectional slot can be defined between the first portion and the second portion. The fuel detection film can be sandwiched between the first portion and the second portion. The fuel detection film can be disposed within the cross-sectional slot of the housing. The first portion and the second portion can be coupled together, such that the fuel detection film is sandwiched between the first portion and the second portion, and the fuel detection film spans across the first inner bore of the housing. The housing can be coupled to the pipe, such that the first inner bore of the housing is aligned with the second inner bore of the pipe for flowing the lubrication oil. The multimeter can be coupled to the fuel detection film at the two locations on the fuel detection film. The two locations can be at opposite ends of the fuel detection film. The first portion and the second portion can be made of silicon, glass, quartz, polymethyl methacrylate, or any combinations of these. The fuel detection film can have a thickness in a range of from about 5 μm to about 500 μm The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a device for detecting the presence of hydrocarbon fuels in lubrication oils. The device includes patterned sheet of cyclic olefin copolymer (COC). COC is soluble in aromatic hydrocarbons, which are typically present in fuels such as gasoline and diesel. Some examples of aromatic hydrocarbons include benzene, alkylbenzenes (for example, toluene), and naphthalene. COC is insoluble in paraffins, which typically make up high viscosity lubrication oils. Paraffins are saturated hydrocarbons and often referred to as alkanes. A lubrication oil (which is being tested for the presence of hydrocarbon fuels) is flowed through the device. If hydrocarbon fuels are present in the lubrication oil, the hydrocarbon fuels will cause the COC sheet to dissolve and change shape. The dissolution rate of the COC sheet can be correlated to the concentration of hydrocarbon fuel present in the lubrication oil.

The subject matter described in this disclosure can be implemented in particular implementations, so as to realize one or more of the following advantages. The apparatus is small and portable (for example, having a total volume of less than 1 cubic feet), thus the apparatus can be used in various locations that use or transport lubrication oils. For example, the apparatus can be used in a laboratory, onsite at a pipeline, or onsite at a processing facility that uses lubrication oil. The apparatus can be used to quickly test a small sample of a lubrication oil to identify cases in which smugglers may be trying to smuggle hydrocarbon fuels by hiding them in the transport of lubrication oils. Thus, the apparatuses and methods described can be implemented to mitigate or prevent hydrocarbon fuel smuggling in a quick, reliable manner. The patterned COC sheet is porous and can dissolve quickly. The patterned COC sheet can enhance surface area contact of the test fluid with the COC sheet. The patterned COC sheet can be versatile in that it can fabricated to have varying orientations and/or patterns.

Figure 1A:
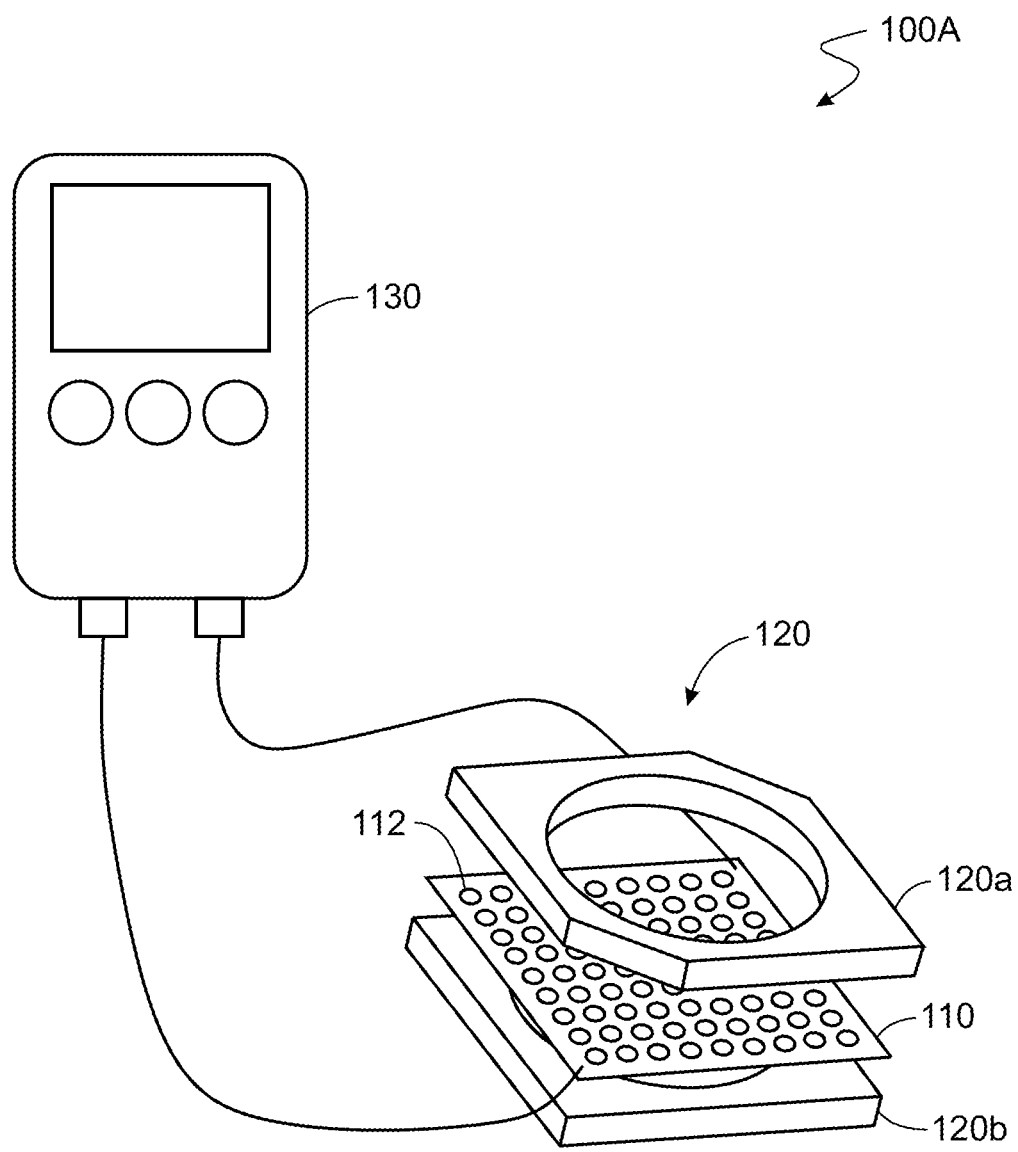
FIG. 1A is a schematic diagram of an example assembly for an apparatus for detecting hydrocarbon fuels in lubrication oils.
Figure 1B:
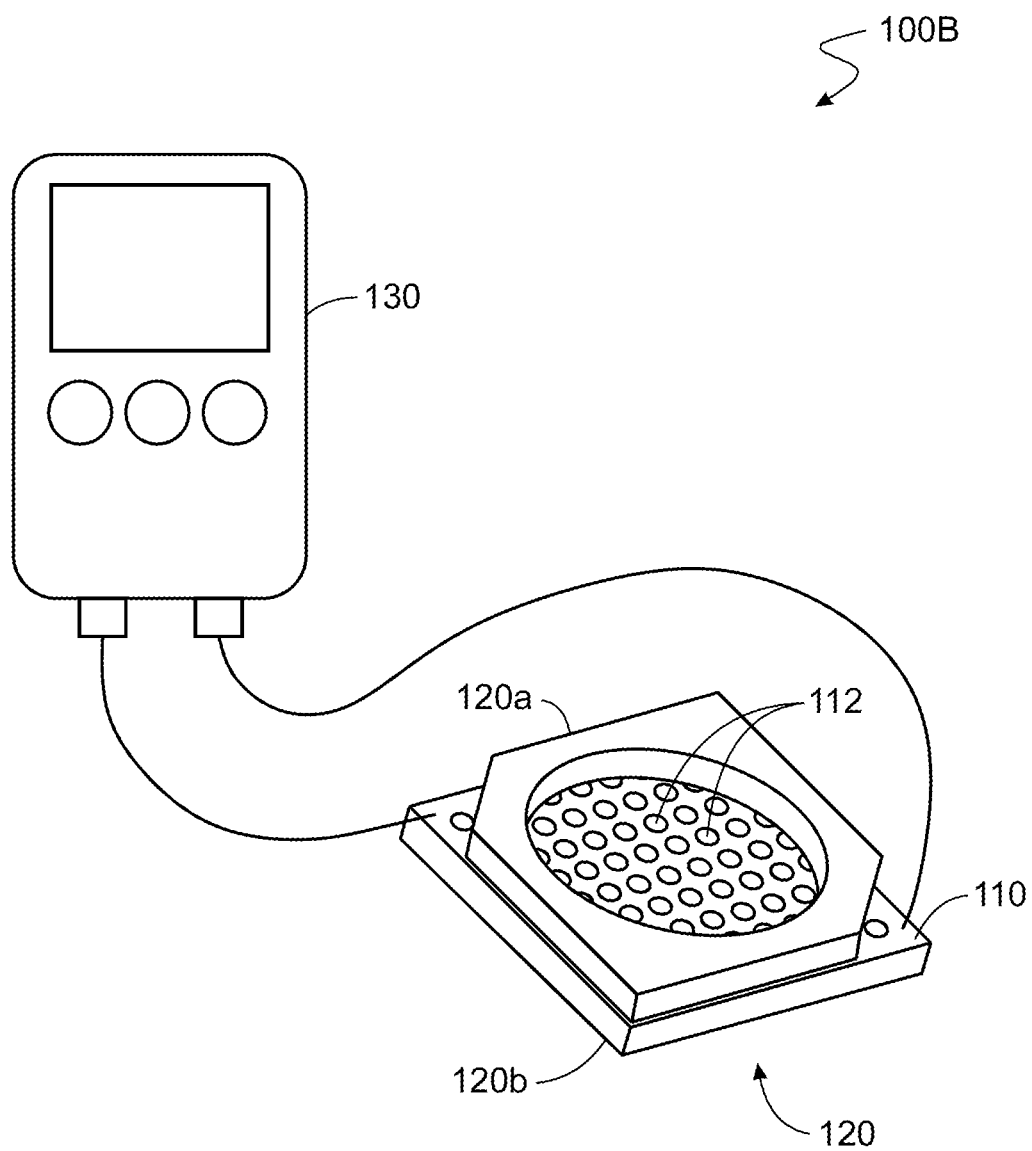
FIG. 1B is a schematic diagram of the apparatus of FIG. 1A after it has been assembled.

FIG. 1A is a schematic diagram of an example assembly 100A for an apparatus 100B for detecting hydrocarbon fuels in lubrication oils. FIG. 1B is a schematic diagram of the apparatus 100B after the assembly 100A of FIG. 1A has been assembled. The assembly 100A (and apparatus 100B) includes a fuel detection film 110 and a housing 120. The fuel detection film 110 includes a cyclic olefin copolymer. For example, the fuel detection film 110 is partially or wholly made of the cyclic olefin copolymer. The cyclic olefin copolymer is insoluble in acyclic (branched or unbranched) saturated hydrocarbons having a chemical formula of $C_nH_{2n+2}$ (paraffins), where n is an integer. Some examples of acyclic saturated hydrocarbons include methane, ethane, propane, butane, pentane, and hexane (and isomers thereof). The cyclic olefin copolymer is soluble in aromatic hydrocarbons, such as benzene, alkylbenzenes (for example, toluene and xylene), styrene, and naphthalene. In some implementations, the cyclic olefin copolymer is soluble in substituted aromatic hydrocarbons (that is, aromatic hydrocarbons that include substitutions of other elements, such as oxygen or nitrogen), such as aniline, phenol, and benzaldehyde. In some implementations, the cyclic olefin copolymer includes an ethylene-norbornene copolymer. As one non-limiting example, the cyclic olefin copolymer can include TOPAS® cyclic olefin copolymer grade 5013L-10 with a 3-millimeter nominal granule size.

The fuel detection film 110 has a porous structure that defines pores 112. The pores 112 of the fuel detection film 110 are configured to allow flow of a lubrication oil through the fuel detection film 110 via the pores 112. The pores 112 can be of uniform size or can have varying sizes. The pores 112 can have the same shape or can have varying shapes. The pores 112 can be distributed uniformly across the fuel detection film 110 or can be distributed randomly across the fuel detection film 110. In some implementations, the openings of the pores 112 have an average diameter in a range of from about 10 micrometers (μm) to about 100 μm. The fuel detection film 110 can be made by spin coating. For example, the cyclic olefin copolymer can be dissolved in a solvent (such as toluene), and the solution (including solvent and dissolved cyclic olefin copolymer) can be spin-coated onto a patterned substrate, which acts as a mold. After spin coating, the solvent can then be evaporated (for example, by a heater or by resting at room temperature), leaving behind the cyclic olefin copolymer. The cyclic olefin copolymer can be released from the substrate (mold) to form the fuel detection film 110. The locations of the pores 112 of the fuel detection film 110 would have an inverse relationship with the substrate (mold), in which the locations of the pores 112 would be at the analogous locations of the raised portions of the substrate (mold). In other words, the fuel detection film 110 can be described as being a negative of the substrate (mold). In some implementations, the fuel detection film 110 has a thickness in a range of from about 5 μm to about 500 μm.

The housing 120 is configured to couple to a pipe that flows lubrication oil. The housing 120 defines a slot (122, shown in FIG. 1B with the housing 120 in assembled form) that is configured to hold the fuel detection film 110. The housing 120 is made of any suitable material that is compatible with (that is, does not react with or degrade in response to exposure to) hydrocarbons and lubrication oil. For example, the housing 120 is made of silicon, glass, quartz, polymethyl methacrylate (PMMA), or any combinations of these. In some implementations, as shown in FIG. 1A, the housing 120 includes a first portion 120a and a second portion 120b. The first portion 120a and the second portion 120b can be coupled together to form the assembled housing 120. The slot 122 is defined between the first portion 120a and the second portion 120b. In some implementations, the first portion 120a and the second portion 120b are adhered together (for example, by an adhesive). In some implementations, the first portion 120a and the second portion 120b are mechanically coupled together (for example, by a fastener, screw, bolt, or any combinations of these). In some implementations, the first portion 120a and the second portion 120b are made of the same material. In some implementations, the first portion 120a and the second portion 120b are made of different materials. In some implementations, the first portion 120a is made of silicon, glass, quartz, PMMA, or any combinations of these. In some implementations, the second portion 120b is made of silicon, glass, quartz, PMMA, or any combinations of these.

The fuel detection film 110 is configured to, while being held by the slot 122 of the housing 120 that is coupled to the pipe as the lubrication oil flows in the pipe, at least partially dissolve in a presence of an aromatic hydrocarbon in the lubrication oil flowing through the fuel detection film 110. For example, if no aromatic hydrocarbons are present in the lubrication oil (that is, hydrocarbon fuel is not present in the lubrication oil), then the fuel detection film 110 would remain intact and not dissolve in response to the lubrication oil flowing through the fuel detection film 110. As another example, if an aromatic hydrocarbon is present in the lubrication oil (that is, hydrocarbon fuel is present in the lubrication oil), then the fuel detection film 110 would at least partially dissolve in response to the lubrication oil flowing through the fuel detection film 110. Thus, the fuel detection film 110 can be implemented to identify lubrication oils that include hydrocarbon fuel.

In some implementations, the assembly 100A (and apparatus 100B) includes a multimeter 130. The multimeter 130 can be coupled to the fuel detection film 110 at two locations on the fuel detection film 110. For example, the multimeter 130 can be coupled to the fuel detection film 110 at opposite ends of the fuel detection film 110. The multimeter 130 can be configured to apply a current across the fuel detection film 110, for example, while the lubrication oil flows through the fuel detection film 110. The current exhibits a voltage drop across the fuel detection film 110. The multimeter 130 is configured to detect the voltage drop exhibited by the current applied across the fuel detection film 110. The multimeter 130 is configured to measure a resistance of the fuel detection film 110 at least based on the voltage drop exhibited by the current applied across the fuel detection film 110. A change in the resistance of the fuel detection film 110 can indicate that at least part of the fuel detection film 110 has dissolved, which in turn, can indicate the presence of an aromatic hydrocarbon (for example, hydrocarbon fuel such as gasoline and/or diesel) in the lubrication oil. For example, a decrease in resistance of the fuel detection film 110 can indicate loss of material (for example, at least partial dissolution) of the fuel detection film 110, which can indicate the presence of an aromatic hydrocarbon (for example, hydrocarbon fuel such as gasoline and/or diesel) in the lubrication oil.

Figure 2:
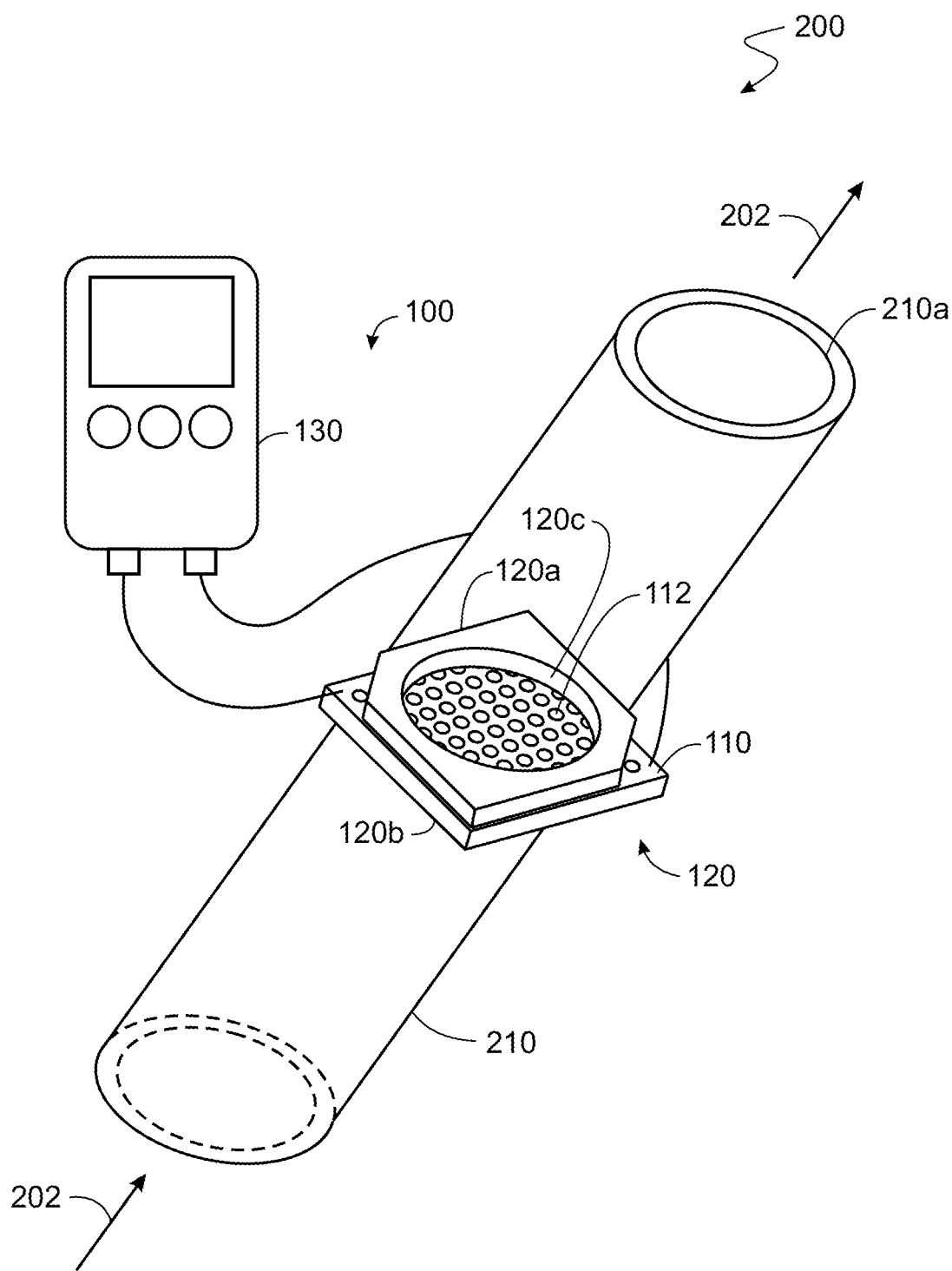
FIG. 2 is a schematic diagram of an example system for detecting hydrocarbon fuels in lubrication oils.

FIG. 2 is a schematic diagram of an example system 200 for detecting hydrocarbon fuels in lubrication oils. The system 200 includes a pipe 210 and the apparatus 100B. The pipe 210 defines an inner bore 210a that is configured to flow a lubrication oil 202. The housing 120 of the apparatus 100B is coupled to the pipe 210. The housing 120 defines an inner bore 120c. The inner bore 120c of the housing 120 is aligned with the inner bore 210a of the pipe 210 for flow of the lubrication oil 202. For example, a central axis of the inner bore 120c of the housing 120 can be inline with a central axis of the inner bore 210a of the pipe 210. The housing 120 defines the cross-sectional slot 122, and the fuel detection film 110 is disposed within the slot 122. The fuel detection film 110 spans across the inner bore 120c of the housing 120. The multimeter 130 is coupled to the fuel detection film 110 at two locations on the fuel detection film 110. For example, the multimeter 130 is coupled at opposite ends of the fuel detection film 110. As the lubrication oil 202 flows through the pipe 210 and across the fuel detection film 110, the multimeter 130 applies a current across the fuel detection film 110. The current applied by the multimeter 130 exhibits a voltage drop across the fuel detection film 110. The multimeter 130 detects the voltage drop exhibited by the current applied across the fuel detection film 110. The multimeter 130 measures a resistance of the fuel detection film 110 at least based on the voltage drop exhibited by the current applied across the fuel detection film 110. A decrease in the resistance of the fuel detection film 110 can indicate that at least part of the fuel detection film 110 has dissolved, which in turn, can indicate the presence of an aromatic hydrocarbon (for example, hydrocarbon fuel such as gasoline and/or diesel) in the lubrication oil 202.

Figure 3:
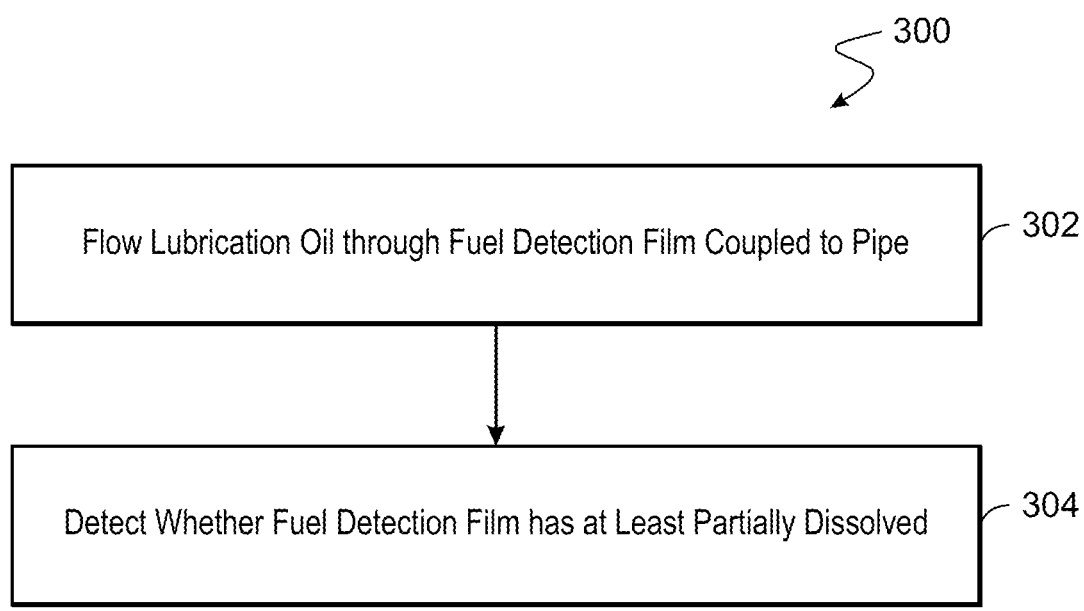
FIG. 3 is a flow chart of an example method for detecting hydrocarbon fuels in lubrication oils.

FIG. 3 is a flow chart of an example method 300 for detecting hydrocarbon fuels in lubrication oils. The apparatus 100B or the system 200 can, for example, implement the method 300. At block 302, a lubrication oil (such as the lubrication oil 202) is flowed through a fuel detection film (such as the fuel detection film 110) coupled to a pipe (such as the pipe 210). As described previously, the fuel detection film 110 includes a cyclic olefin copolymer that is insoluble in acyclic saturated hydrocarbons, and the fuel detection film 110 has a porous structure defining pores (such as the pores 112) that are configured to allow flow of the lubrication oil 202 through the fuel detection film 110 via the pores 112. The fuel detection film 110 is configured to at least partially dissolve in a presence of an aromatic hydrocarbon (for example, a component of a hydrocarbon fuel, such as gasoline and/or diesel) in the lubrication oil 202 flowing through the fuel detection film 110. At block 304, it is detected whether the fuel detection film 110 has at least partially dissolved in response to the lubrication oil 202 flowing through the fuel detection film 110. Detection at block 304 that at least a portion of the fuel detection film 110 has dissolved (at least partial dissolution of the fuel detection film 110) in response to the lubrication oil 202 flowing through the fuel detection film 110 at block 302 indicates that the aromatic hydrocarbon is present in the lubrication oil 202. Thus, detecting that at least a portion of the fuel detection film 110 has dissolved at block 304 indicates that hydrocarbon fuel (such as gasoline and/or diesel) is present in the lubrication oil 202.

In some implementations, the method 300 includes applying a current across the fuel detection film 110 as the lubrication oil 202 flows through the fuel detection film 110. The current can be applied across the fuel detection film 110, for example, by the multimeter 130. In some implementations, the method 300 includes measuring a resistance of the fuel detection film 110 at least based on a voltage drop exhibited by the current applied across the fuel detection film 110 in response to the current applied across the fuel detection film 110. The resistance of the fuel detection film 110 can be measured, for example, by the multimeter 130. Detecting whether the fuel detection film 110 has at least partially dissolved at block 304 can include detecting a change (for example, a decrease) in the resistance of the fuel detection film 110. A decrease in the resistance of the fuel detection film 110 can, for example, indicate at least partial dissolution of the fuel detection film 110 and, in turn, the presence of the aromatic hydrocarbon in the lubrication oil 202.

In some implementations, the fuel detection film 110 is disposed within a cross-section slot (such as the slot 122) of a housing (such as the housing 120) that is coupled to the pipe 210. As described previously, the housing 120 can define an inner bore 120c that is aligned with an inner bore 210a of the pipe 210 while the housing 120 is coupled to the pipe 210. The fuel detection film 110 can span across the inner bore 120c of the housing 120. The housing 120 can include a first portion 120a and a second portion 120b that are coupled together. The cross-sectional slot 122 can be defined between the first portion 120a and the second portion 120b. The fuel detection film 110 can be sandwiched between the first portion 120a and the second portion 120b. The method 300 can include disposing the fuel detection film 110 within the cross-sectional slot 122 of the housing 120 and coupling the first portion 120a and the second portion 120b together, such that the fuel detection film 110 is sandwiched between the first portion 120a and the second portion 120b, and the fuel detection film 110 spans across the inner bore 120c of the housing 120. The method 300 can include coupling the housing 120 to the pipe 210, such that the inner bore 120c of the housing 120 is aligned with the inner bore 210a of the pipe 210 for flowing the lubrication oil 202. The method 300 can include coupling the multimeter 130 to the fuel detection film 110 at opposite ends of the fuel detection film 110.

Example

Figure 4:
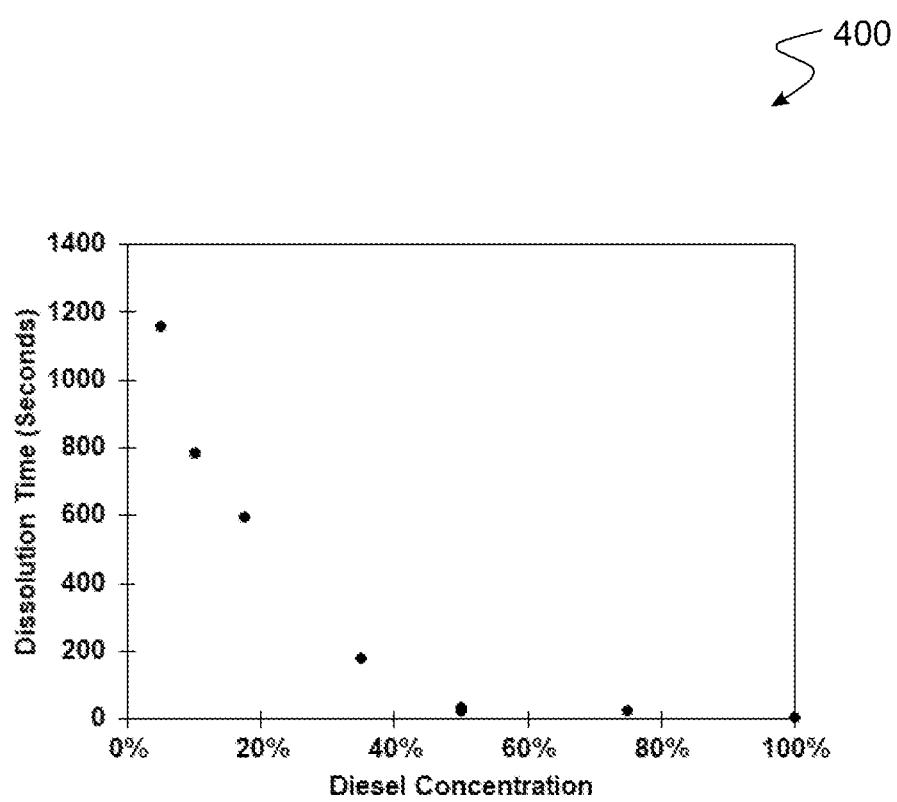
FIG. 4 is a graph of an example experiment that correlates diesel concentration in lubrication oil with dissolution time of a fuel detection film.

FIG. 4 is a graph 400 of an example experiment that correlates diesel concentration (x-axis) in lubrication oil with dissolution time (y-axis) of an implementation of the fuel detection film 110. Dissolution of cyclic olefin copolymer (present in the fuel detection film 110) in response to exposure to aromatic hydrocarbons (for example, present in diesel and/or gasoline) can depend on various factors, such as solvent type (aromatic, paraffin, aqueous, etc.), operating temperature, motion of molecules, concentration of aromatic hydrocarbons, and thin film thickness. In this specific experiment, the operating temperature was maintained at room temperature. The graph 400 for the experiment shows that, in general, dissolution time of the fuel detection film 110 decreased as diesel concentration increased.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An assembly comprising:
   a fuel detection film comprising a cyclic olefin copolymer that is insoluble in acyclic saturated hydrocarbons, the fuel detection film having a porous structure defining a plurality of pores configured to allow flow of a lubrication oil through the fuel detection film via the plurality of pores;
   a housing configured to couple to a pipe flowing the lubrication oil, the housing defining a slot configured to hold the fuel detection film, wherein the fuel detection film, while held by the slot of the housing coupled to the pipe as the lubrication oil flows in the pipe, is configured to at least partially dissolve in a presence of an aromatic hydrocarbon in the lubrication oil flowing through the fuel detection film; and
   a multimeter coupled to the fuel detection film at two locations on the fuel detection film, the multimeter configured to apply a current across the fuel detection film, the multimeter configured to measure a resistance of the fuel detection film at least based on a voltage drop exhibited by the current applied across the fuel detection film in response to the current applied across the fuel detection film, wherein a decrease in the resistance of the fuel detection film indicates at least partial dissolution of the fuel detection film and the presence of the aromatic hydrocarbon in the lubrication oil.

2. The assembly of claim 1, wherein the housing comprises a first portion and a second portion coupled together, and the slot is defined between the first portion and the second portion.

3. The assembly of claim 2, wherein the first portion and the second portion are made of silicon, glass, quartz, polymethyl methacrylate, or any combinations thereof.

4. The assembly of claim 3, wherein the fuel detection film has a thickness in a range of from about 5 micrometers (μm) to about 500 μm.

5. A system comprising:
   a pipe defining a first inner bore configured to flow a lubrication oil;
   a housing coupled to the pipe, the housing defining a second inner bore and a cross-sectional slot, the second inner bore of the housing aligned with the first inner bore of the pipe for flow of the lubrication oil;
   a fuel detection film disposed within the cross-sectional slot of the housing, the fuel detection film spanning across the second inner bore of the housing, the fuel detection film comprising a cyclic olefin copolymer that is insoluble in acyclic saturated hydrocarbons, the fuel detection film having a porous structure defining a plurality of pores configured to allow flow of the lubrication oil through the fuel detection film via the plurality of pores, the fuel detection film is configured to at least partially dissolve in a presence of an aromatic hydrocarbon in the lubrication oil flowing through the fuel detection film; and
   a multimeter coupled to the fuel detection film at two locations on the fuel detection film, the multimeter configured to apply a current across the fuel detection film, the multimeter configured to measure a resistance of the fuel detection film at least based on a voltage drop exhibited by the current applied across the fuel detection film, wherein a change in the resistance of the fuel detection film indicates at least partial dissolution of the fuel detection film and the presence of the aromatic hydrocarbon in the lubrication oil.

6. The system of claim 5, wherein the housing comprises a first portion and a second portion coupled together, and the cross-sectional slot is defined between the first portion and the second portion.

7. The system of claim 6, wherein the first portion and the second portion are made of silicon, glass, quartz, polymethyl methacrylate, or any combinations thereof.

8. The system of claim 7, wherein the fuel detection film has a thickness in a range of from about 5 micrometers (μm) to about 500 μm.

9. A method comprising:
   flowing a lubrication oil through a fuel detection film coupled to a pipe, the fuel detection film comprising a cyclic olefin copolymer that is insoluble in acyclic saturated hydrocarbons, the fuel detection film having a porous structure defining a plurality of pores configured to allow flow of the lubrication oil through the fuel detection film via the plurality of pores, the fuel detection film configured to at least partially dissolve in a presence of an aromatic hydrocarbon in the lubrication oil flowing through the fuel detection film; and
   detecting whether the fuel detection film has at least partially dissolved in response to the lubrication oil flowing through the fuel detection film, wherein at least partial dissolution of the fuel detection film in response to the lubrication oil flowing through the fuel detection film indicates the presence of an aromatic hydrocarbon in the lubrication oil.

10. The method of claim 9, comprising:
    applying a current across the fuel detection film as the lubrication oil flows through the fuel detection film; and
    measuring a resistance of the fuel detection film at least based on a voltage drop exhibited by the current applied across the fuel detection film in response to the current applied across the fuel detection film.

11. The method of claim 10, wherein a multimeter coupled to the fuel detection film at two locations on the fuel detection film applies the current across the fuel detection film and measures the resistance of the fuel detection film, wherein detecting whether the fuel detection film has at least partially dissolved comprises detecting a change in the resistance of the fuel detection film, wherein a decrease in the resistance of the fuel detection film indicates at least partial dissolution of the fuel detection film and the presence of the aromatic hydrocarbon in the lubrication oil.

12. The method of claim 11, wherein:
    the fuel detection film is disposed within a cross-sectional slot of a housing that is coupled to the pipe;
    the housing defines a first inner bore that is aligned with a second inner bore of the pipe through which the lubrication oil flows; and
    the fuel detection film spans across the first inner bore of the housing.

13. The method of claim 12, wherein the housing comprises a first portion and a second portion coupled together, the cross-sectional slot defined between the first portion and the second portion, and the fuel detection film is sandwiched between the first portion and the second portion.

14. The method of claim 13, comprising disposing the fuel detection film within the cross-sectional slot of the housing and coupling the first portion and the second portion together, such that the fuel detection film is sandwiched between the first portion and the second portion, and the fuel detection film spans across the first inner bore of the housing.

15. The method of claim 14, comprising coupling the housing to the pipe, such that the first inner bore of the housing is aligned with the second inner bore of the pipe for flowing the lubrication oil.

16. The method of claim 15, comprising coupling the multimeter to the fuel detection film at the two locations on the fuel detection film, wherein the two locations are at opposite ends of the fuel detection film.

17. The method of claim 16, wherein the first portion and the second portion are made of silicon, glass, quartz, polymethyl methacrylate, or any combinations thereof.

18. The method of claim 17, wherein the fuel detection film has a thickness in a range of from about 5 micrometers (μm) to about 500 μm.

* * * * *